Patented Oct. 21, 1952

2,614,997

UNITED STATES PATENT OFFICE 2,614,997

VINYL ESTERS OF CHEMICALLY STABILIZED ROSINS AND POLYMERS THEREOF

John C. Robinson, Jr., and Walter S. Ropp, Wilmington, Del., assignors to Hercules Powder Company, Wilmington, Del., a corporation of Delaware No Drawing. Application September 16, 1950, Serial No. 185,324

13 Claims. (Cl. 260—27)

This invention relates to a new class of vinyl esters of rosin acids, particularly the vinyl esters of hydrogenated rosin acids and dehydrogenated rosin acids. It further relates to the polymers of such vinyl esters and to a process for the preparation thereof.

The vinyl ester of rosin is known. U. S. 2,066,075, for example, discloses this compound and its preparation by reaction of rosin with acetylene. Few, if any, uses have been developed for the compound, however, possibly due to the fact that, as compared with closely related esters of saturated alcohols, it is more expensive. Another significant factor is the fact that it is exceedingly sluggish in polymerization. The weaker types of peroxide polymerization catalysts have practically no effect on the compound. The stronger types of peroxide catalysts, while they do effect some polymerization of the compound, are productive only of low yields of low molecular weight compounds. Hence, the polymerization of the vinyl ester of rosin has not been attractive either technically or economically.

It has now been found unexpectedly that vinyl esters of a rosin acid wherein the rosin acid radical is stabilized chemically have quite different properties as compared with the vinyl esters of rosin. Chemical stabilization as used herein includes both hydrogenation and dehydrogenation. Both of these treatments as applied to rosin and certain rosin compounds are well known to the art. The vinyl esters with which this invention is concerned are accordingly the vinyl esters of a hydrogenated rosin acid and the vinyl esters of a dehydrogenated rosin acid.

According to this invention, it has been found that the aforesaid vinyl esters of chemically stabilized rosin acids polymerize in the presence of a peroxide catalyst with ease as compared with the related vinyl ester of rosin. In fact, the vinyl esters of chemically stabilized rosin acids can generally be polymerized in substantial yield using comparatively weak peroxide polymerization catalysts. This is in marked contrast to the reaction of the vinyl ester of rosin in the presence of these catalysts. This ester, as has been previously stated, is practically speaking unaffected by weak peroxide polymerization catalysts of the type of benzoyl peroxide. When comparatively strong peroxide catalysts are used in conjunction with the vinyl esters of chemically stabilized rosin acids, exceptionally high yields of polymer are obtained as contrasted with the low yields of polymer resulting when the vinyl ester of rosin is used as the monomer.

Another important and interesting fact has derived from the use of the vinyl esters of a chemically stabilized rosin acid as the monomer in the type of polymerization here under consideration. The resulting polymers have substantially higher molecular weights than do polymers prepared from the vinyl ester of rosin under identical conditions. The higher molecular weight brings with it the concomitant advantageous properties—higher softening point, greater hardness, etc.

The polymerization of the vinyl esters of a chemically stabilized rosin acid is preferably effected by contacting the desired ester with a peroxide polymerization catalyst at a suitable temperature. Another effective procedure involves subjecting the desired monomer to ultraviolet light with or without the use of a suitable activator such as biacetyl, acetone, etc. Still another effective procedure for polymerization of the subject vinyl esters involves merely heating the monomer in bulk at a temperature of at least 200° C.

Having described the invention in its broadest aspects, the following examples are given as illustrative embodiments thereof. They should not be considered as limiting the invention, however, but merely as specific embodiments of the broad concept. All parts and percentages are by weight unless otherwise indicated.

The following examples relate to the perparation of vinyl esters of chemically stabilized rosin acids by ester interchange.

EXAMPLE 1

A mixture of 200 parts of hydrogenated rosin, 400 parts of vinyl acetate, 4 parts of mercuric acetate, and 0.6 part of concentrated sulfuric acid was refluxed for about 4 hours in a round bottom flask equipped with reflux condenser. The hydrogenated rosin employed was one which was about 45% saturated with hydrogen and which had an abietic-type resin acid content of about 5%. To the resulting product was added 5 parts of sodium acetate for the purpose of removing the sulfuric acid catalyst. The precipitated sodium sulfate was removed by filtration. Excess vinyl acetate and acetic acid formed in the reaction were removed by a vacuum stripping operation. The resulting product was distilled in vacuo (6 mm. Hg and 210° C. being the final pressure and temperature, respectively) to give a 75% yield of the vinyl ester of hydrogenated rosin.

EXAMPLE 2

Example 1 was repeated using in place of the hydrogenated rosin a dehydrogenated rosin derived from wood rosin by heating with a palladium catalyst in the absence of added substances capable of reducing the unsaturation thereof. It had a dehydroabietic acid content of about 45% and an abietic-type resin acid content of about 0%. The vinyl ester of the dehydrogenated rosin employed was obtained in approximately 75% yield.

The following examples are illustrative of the preparation of vinyl esters of chemically stabilized rosins via direct vinylation with acetylene.

EXAMPLE 3

Five hundred parts of dehydrogenated wood rosin of the type employed in Example 2, 44 parts of anhydrous zinc acetate, and 87 parts of toluene were placed in a rocking type autoclave of suitable capacity. The mixture was heated to 185° C. and shaken for 10 minutes to allow zinc resinate to form. Acetic acid and toluene were bled off as the pressure was reduced to 0–20 p. s. i. (gauge). The bomb was then pressured with acetylene to 150–250 p. s. i. (gauge) and agitated at 195° C. as long as acetylene was taken up (approx. 7 hours required). The resulting product was distilled in vacuo and yielded 339 parts of the vinyl ester of dehydrogenated rosin. It had a boiling point of 150–175° C. at 1 mm. Hg absolute pressure. This corresponded with a yield of 62%.

EXAMPLE 4

Example 3 was repeated using 500 parts of hydrogenated rosin and using xylene instead of toluene as solvent. The hydrogenated rosin used was a rosin which was about 45% saturated with hydrogen and which had an abietic-type resin acid content of about 5%. The distilled vinyl ester of the hydrogenated rosin was obtained in the amount of 270 parts (50% yield). It boiled at 150–175° C. at 1 mm. Hg absolute pressure.

EXAMPLE 5

Example 4 was repeated replacing the particular hydrogenated rosin there employed with another hydrogenated rosin. This other hydrogenated resin was a rosin which had been hydrogenated to the extent that it was 98% saturated with hydrogen. Thus, it was a substantially completely hydrogenated rosin. It had an abietic-type resin acid content of 0%. The vinyl ester of hydrogenated rosin obtained in this case amounted to 350 g. which is 64% of theory.

The following examples relate to the polymerization of vinyl esters of chemically stabilized rosin acids.

EXAMPLE 6

A solution of 10 parts of the vinyl ester of hydrogenated rosin of the type obtained in Example 5 above and 0.50 part (5%) of benzoyl peroxide in 9 parts of benzene was heated for 22 hours at 70° C. in a sealed evacuated Pyrex glass tube. The reaction product was treated to isolate the polymer by precipitation from 156 parts of ethyl alcohol and drying the resulting precipitate at 80° C. for 20 hours at 14 mm. Hg absolute pressure. The polymer thus obtained weighed 9.48 parts, and hence was obtained in a yield of 95% of theory. It had a specific viscosity (1% in benzene) of 0.075 and a molecular weight as determined cryoscopically using benzene as solvent of 2650. The polymer was water white in color. It was soluble in aliphatic hydrocarbons such as hexane, heptane, etc., aromatic hydrocarbons such as benzene, xylene, etc., and chlorinated solvents such as ethylene dichloride, carbon tetrachloride, etc.

EXAMPLE 7

In this example the vinyl ester of hydrogenated rosin obtained in accordance with Example 4 was employed. A mixture of 5 parts of the vinyl ester of hydrogenated rosin, 0.25 part (5%) di-(tert-butyl) peroxide and about 1 part of benzene was sealed under vacuum in a Pyrex glass tube. The tube and contents were heated for 89 hours at 120° C. The polymer was isolated from the reaction mass by precipitation from ethanol as in Example 6. In this manner 3.44 parts (69% yield) of polymer having a 1% specific viscosity in benzene of 0.036 were obtained.

EXAMPLE 8

In this example 10 parts of the vinyl ester of dehydrogenated rosin were polymerized by subjection to ultraviolet radiation. (The dehydrogenated rosin in this case was one derived from rosin by heating with a palladium catalyst in the absence of added substances capable of reducing the unsaturation of the rosin. It had a dehydroabietic acid content of about 45% and an abietic-type resin acid content of about 0%.) The vinyl ester in the amount of 10 parts was measured into a glass tube and 0.01 part of biacetyl added as an activator. The tube was sealed under vacuum and irradiated with a 250-watt mercury arc bulb placed 2 inches from the tube. Irradiation was continued for 65 hours, after which period the reaction mass was dissolved in 9 parts of benzene. The polymer was isolated from the benzene solution by precipitation from 156 parts of ethyl alcohol. After vacuum drying as in Example 6 the polymer weighed 4.2 parts (42% yield). It was light brown in color and had a specific viscosity in 1% benzene of 0.040.

EXAMPLES 9–11, INCLUSIVE

A series of experiments was carried out in which different vinyl esters of chemically stabilized rosins were polymerized using benzoyl peroxide at catalyst (0.50% based on the vinyl ester) under identical conditions. A mixture of the vinyl ester and the benzoyl peroxide was heated at 80° C. in each case in a sealed evacuated tube for a period of 5 hours. The polymer was isolated by dissolving in benzene, precipitating from ethyl alcohol, and drying the solid polymer in accordance with the procedure described in Example 6 hereof. Table I infra summarizes the results obtained. (Under these conditions the vinyl ester of rosin does not undergo polymerization.)

*Table I*

| Example | Vinyl Ester | Conversion | Drop Softening Point |
|---|---|---|---|
| | | Percent | ° C. |
| 9 | Hydrogenated rosin [1] | 92 | 180 |
| 10 | do [2] | 26 | 128 |
| 11 | Dehydrogenated rosin [3] | 17 | 112 |

[1] 98% saturated with hydrogen; 0% abietic-type resin acids.
[2] 70% saturated with hydrogen; 0% abietic-type resin acids.
[3] A dehydrogenated rosin derived from rosin by heating with a palladium catalyst in the absence of added substances capable of reducing the unsaturation of the rosin. It had a dehydroabietic acid content of about 45% and contained no abietic-type resin acids.

EXAMPLES 12–18, INCLUSIVE

Another series of experiments was carried out in which different vinyl esters of chemically stabilized rosins were polymerized in comparison with the vinyl ester of a wood rosin using di(tert-butyl) peroxide as catalyst (5.00%) based on the vinyl ester under identical conditions. The same polymerization procedure was used as in Examples 9–11, inclusive, except that a temperature of 140° C. was employed and the polymerizations carried out for a period of 7 hours. The method of isolating the polymers was the same as that used in Examples 9–11, inclusive. Table II infra summarizes the results obtained.

Table II

| Example | Vinyl Ester | Conversion | Drop Softening Point | 1% Specific Viscosity in Benzene |
|---|---|---|---|---|
| | | Percent | | |
| 12 | N wood rosin | 27 | 115 | 0.027 |
| 13 | Hydrogenated rosin [1] | 72 | 146 | 0.042 |
| 14 | do.[1] | 73 | 145 | 0.043 |
| 15 | Dehydrogenated rosin [2] | 76 | 171 | 0.047 |
| 16 | do.[2] | 79 | 151 | 0.047 |
| 17 | Hydrogenated rosin [3][4] | 79 | 199 | 0.177 |
| 18 | do.[3][5] | 89 | 167 | 0.103 |

[1] 45% saturated with hydrogen; about 5% abietic-type resin acids.
[2] A dehydrogenated rosin derived from rosin by heating with a palladium catalyst in the absence of added substances capable of reducing the unsaturation of the rosin. It had a dehydroabietic acid content of about 45% and contained no abietic-type resin acids.
[3] 98% saturated with hydrogen; abietic-type resin acids nil.
[4] Only 2.5% polymerization catalyst employed due to fact that 5.0% caused gelation.
[5] Only 1.25% polymerization catalyst employed for same reason.

It is evident from the above results that there is a very substantial increase in yield of polymer when vinyl esters of chemically stabilized rosins are used in place of the vinyl ester of rosin in a di(tert-butyl) peroxide-catalyzed system. The results show further that the molecular weight of the polymers in the case of the vinyl esters of chemically stabilized rosins are substantially higher than the molecular weight of the polymer of the vinyl ester of rosin. (Relative molecular weights of the polymers are shown by the specific viscosity data.) As the data indicate, the higher molecular weights of the polymers of the chemically stabilized rosins are reflected in their higher drop softening points as compared with the polymer of the vinyl ester of rosin.

In describing the invention in its broad aspects heretofore the term "rosin acid" has been employed. Thus, the monomers of the invention are defined as "vinyl esters of a hydrogenated rosin acid" and "vinyl esters of a dehydrogenated rosin acid." The term "rosin acid" is here used in a generic sense to include both commercial rosins, which are known to contain a neutral body fraction as well as a rosin acid fraction, and the rosin acid fractions obtained therefrom. Thus, there is included wood rosin, gum rosin, and the substantially entirely acidic fractions obtained therefrom as by distillation, combination saponification and extraction processes, etc. It is well known, too, that the acidic fraction contained in wood or gum rosin is a mixture of isomeric resin acids which include abietic, levopimaric, dextropimaric, neoabietic, isodextropimaric, etc., acids. Such specific compounds are equivalent to the naturally occurring mixtures found in wood or gum rosin for present purposes and the term "rosin acid" is intended to be inclusive thereof; however, from an economic standpoint, the naturally occurring wood or gum rosin or acidic fractions thereof are preferred.

The hydrogenated rosin acids employed in accordance with this invention may be made by any of the known procedures for hyrogenating rosin acids. As examples thereof, there may be mentioned the procedures of U. S. 2,094,117 and U. S. 2,155,036. Other procedures which are of interest are those described in U. S. 2,174,651; U. S. 1,973,865; U. S. 2,113,808; and U. S. 2,346,793.

Rosin acids of various degrees of hydrogenation may be used in preparing vinyl esters in accordance with this invention. In general, any of the prior art hydrogenated rosin acids may be employed. It is preferred, however, to employ a hydrogenated rosin acid which is at least 40% saturated with hydrogen and which has a content of abietic-type resin acids of not over 10%. It is most preferred to employ a hydrogenated rosin acid having a content of abietic-type resin acids of substantially 0%.

"Per cent saturation with hydrogen" as applied to any particular sample of hydrogenated rosin acid means $$\frac{100\% \times \text{No. of g. of } H_2 \text{ absorbed per 100 g. of the initial rosin acid in preparing the sample}}{\text{No. of g. of } H_2 \text{ absorbed per 100 g. of the initial rosin acid in preparing a completely saturated rosin acid}}$$

A "completely saturated rosin acid" is one prepared under such strenuous conditions of hydrogenation that substantially all of the ethylenic double bonds contained in the starting rosin acid are saturated with hydrogen. The analytical procedure used to effect complete saturation of a rosin acid is described in detail infra.

As stated above, it is preferred that the hydrogenated rosin acid employed have a content of abietic-type resin acids of not over 10%, and most preferred that the content of abietic-type resin acids be substantially 0%. By "abietic-type resin acids" there is meant the class of resin acids having the carbon skeleton of abietic acid, i. e.

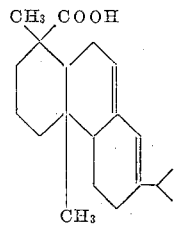

and having two ethylenic double bonds per molecule. Resin acids falling in this class are abietic acid, levopimaric acid, and neoabietic acid. This class of resin acids is sometimes described in the literature as acids of the levopimaric acid-abietic acid structural group.

As has been indicated by the data in Example 6, a substantially completely hydrogenated rosin acid is rather unique in so far as this invention is concerned in that vinyl esters thereof polymerize with ease to give very high conversions to polymers even in the presence of small amounts of a relatively weak peroxide catalyst such as benzoyl peroxide. The other vinyl esters of chemically stabilized rosin acids polymerize under these conditions but the conversions are not nearly as high as in the case of the vinyl ester of substantially completely hydrogenated rosin acid.

The dehydrogenated rosin acids used in accordance with this invention may be prepared according to known procedures. As exemplary of known procedures of dehydrogenating rosin acids there are mentioned the heating of rosin acid for one to two hours at 150° C. to 200° C. with a dehydrogenation catalyst such as iodine or sulfur, in the amount of 0.5 to 4% of the rosin acid. Dehydrogenated rosin acids may also be produced by what is known in the art as the "disproportionation" reaction. A disproportionated rosin acid is a rosin acid that has been treated with an active hydrogenation catalyst under conditions of reaction adapted to produce an intra- and inter-molecular rearrangement of the hydrogen atoms in the rosin acids contained therein and in the absence of added substances capable of reducing the unsaturation of the rosin acid under the conditions of treatment. Such disproportionated rosin acids have a substantial proportion of dehydrogenated acidic constituents and are properly regarded as dehydrogenated rosin acids. See in this connection U. S. 2,154,629 to Littmann. Other materials which are properly classed as dehydrogenated rosin acids and which can be used as such in accordance with this invention are pyroabietic acid which is rich in dehydroabietic acid, etc. It may be prepared by heating a rosin acid for one to four hours at 260–315° C. The pseudopimaric acid which is described in U. S. 2,072,628 is similarly suitable.

The above-described procedures for preparing dehydrogenated rosin acids provide products having a rather wide variety of degrees of dehydrogenation. It will be understood in this connection that the rosin acids present in wood and gum rosin are substantially entirely isomeric compounds possessing the empirical formula $C_{20}H_{30}O_2$. These isomers possess two ethylenic double bonds per molecule. Upon subjection to the known dehydrogenation processes a proportion of the isomeric acids lose two atoms of hydrogen and it is believed that the resulting three ethylenic bonds arrange themselves in the form of the most stable configuration, the benzene ring. Such acids have the empirical formula $C_{20}H_{28}O_2$ and are commonly referred to as "dehydroabietic acid." Obviously, the content of dehydroabietic acid of a dehydrogenated rosin acid is a measure of the degree of dehydrogenation of the original rosin acid.

As explained above, rosin acids having a variety of degrees of dehydrogenation result from the procedures for dehydrogenation described in the art. In general, any of the prior art dehydrogenated rosin acids may be employed in practicing this invention. It is preferred, however, to employ one having a dehydroabietic acid content of at least 40% and having an abietic-type resin acid content of not over 10%. It is still further preferred to employ a dehydrogenated rosin acid having a content of abietic-type resin acids of substantially 0%.

Any of the known peroxide polymerization catalysts may be employed in polymerizing the monomers of this invention to provide desirable homopolymers. Thus, for example, benzoyl peroxide, acetyl peroxide, dibenzal diperoxide, cumene hydroperoxide ($\alpha,\alpha$-dimethyl benzyl hydroperoxide), di($\alpha,\alpha$-dimethyl benzyl) peroxide, di(tert-butyl) peroxide, tert-butyl perbenzoate, etc., may be employed. Di(tert-butyl) peroxide is a particularly strong catalyst for the polymerization reaction here involved and is for that reason preferred. As hereinbefore indicated, it is not absolutely essential that one employ a peroxide polymerization catalyst in effecting polymerization of vinyl esters of chemically stabilized rosin acids. Subjection of the monomers to ultraviolet radiation and mere heating of the monomers are both effective.

When polymerization of the monomers is effected in the presence of a peroxide polymerization catalyst, a rather wide range of temperatures may be employed. The useful temperature ranges vary somewhat with the particular catalyst employed, also with the medium in which the polymerization is effected, i. e., whether the monomer is being polymerized in bulk, in solution in an inert solvent, or in the form of an aqueous emulsion. In general, however, the preferred temperature range for carrying out the polymerization is from 30° C. to 150° C.

The polymers when isolated from the reaction masses by precipitation from ethyl alcohol, as was done in the examples, are obtained in the form of amorphous powders. These powders once melted solidify to hard clear resins which vary in color from colorless to yellow or red. (They are rather high melting, having softening points as determined by the Hercules drop method in the range of from about 100° C. to about 250° C.) It is, of course, possible to isolate relatively pure polymers from the reaction masses by distillation. In this manner the polymers are obtained in resinous form directly rather than in the form of amorphous powders. The specific viscosities of the polymers, as determined on 1% solution of the polymers in benzene, have run from about 0.04 to about 0.2. On this basis the polymer appears to have molecular weights within the range of from about 1000 to about 70,000.

The polymers of this invention are useful in the manufacture of protective coatings. Thus, they may be cooked with drying oils according to known techniques to provide useful oleoresinous varnishes from which desirable enamels may be made. Oleoresinous varnishes prepared from tung oil in particular have a rapid dry, good alkali and water resistance, excellent flexibility, and good color. They are also useful as the resinous ingredients of heat-set inks. In the manufacture of heat-set inks a vehicle is prepared by dissolving the polymer in a solvent therefor which is substantially nonvolatile at 70° F. but which evaporates readily at temperatures of the order of 200–240° F. Petroleum solvents are usually employed for this purpose. Pigments are then ground in this vehicle, usually on a 3-roll mill. The subject polymers are particularly interesting in this utility in that they provide inks which are entirely neutral and which are therefore non-reactive with pigments.

The polymers of the subject vinyl polymers are rather outstanding in their use as modifiers for paraffin wax to provide compositions useful in the paper converting field. Paraffin wax is used in the paper converting field for the purpose of moisture-proofing cardboard, etc. It has now been found that the subject polymers are compatible with fully refined and with oxidized paraffin wax. Moreover, the blends maintain their compatibility when held at elevated temperatures (100° C.) for long periods of time without any formation of sludge. At the same time, the polymers contribute increased flexibility, adhesion and cohesion to the paraffin film. There is no substantial difference between the crude polymers (i. e., the reaction masses first obtained) and the refined polymers in this respect. Both the crude and the refined polymers may also be combined with natural and synthetic rubbers, such as neoprene, GR–S, etc., in the manufacture of solvent-type adhesives.

The analytical method referred to supra for quantitatively completely hydrogenating a rosin acid is the following. This method effects removal of all unsaturation of the rosin acid existing due to the presence of carbon-carbon double bonds and aromatic nuclei.

The method consists of reducing a suspenion of platinum oxide in acetic acid to platinum black in an atmosphere of hydrogen, adding a weighed sample of the rosin acid to the catalyst suspension and measuring the amount of hydrogen absorbed by the rosin acid.

The reagents employed are (1) acetic acid, empyreuma-free (passing dichromate test), (2) platinum oxide catalyst of the type described by Voorhees and Adams, J. A. C. S., 44, 1397 (1922), and by Adams and Shriner, J. A. C. C., 45, 2171 (1923), and (3) commercial hydrogen.

The apparatus employed includes a gas measuring buret, a reaction flask, and a magnetic stirrer. The gas buret employed is that described by C. R. Noller and M. R. Barusch, Industrial and Engineering Chemistry, anal. ed., vol. 14, 907 (1942), with the exceptions (1) there is a T and stopcock between the reaction flask (B) and the calibrated section of the buret (A) so that air may be removed and hydrogen admitted by alternate evacuation and filling and (2) there is a 25 ml. reservoir just below the calibrations of said section. The reaction flask employed is similar to that of Noller et al. except that in place of the side arm with cup it has a side arm fitted with a ground glass stopper. The stopper end (within the flask) is so made as to permit a sample cup placed thereon to drop to the bottom of the flask when the stopper handle is turned 90 degrees.

Remove the side arm of the reaction flask and weigh in 0.10±0.01 g. PtO catalyst. Add a glass-encased iron wire and wash the catalyst into the flask with 5 ml. acetic acid. Grease the upper half of the ground joint on the side arm and insert in flask. Weigh the sample of rosin acid (0.15–0.20 g.) to the nearest 0.0001 g. into a 9 x 15 mm. sample cup. If the sample is a powdered solid, moisten with a drop of acetic acid. Place the sample cup in the neck of the flask where it is supported by the end of the stopper. Connect the flask to the gas buret using a thin film of grease on the ground glass joint, evacuate the apparatus and fill the same with hrydogen. Repeat the evacuation and filling cycle four times. The final filling with hydrogen should almost completely fill the reservoir at the base of the buret. When this condition is reached, the flow of hydrogen into the buret is stopped by closing the proper stopcocks.

A magnetic stirrer is placed below the reaction flask and started. The speed is regulated so that stirring is just sufficiently vigorous to break the liquid surface. At this point reduction of the catalyst starts. When the catalyst is completely reduced to platinum black as evidenced by no further change in the mercury level (this requires about 1 hour), the mercury surfaces in the buret are leveled using the mercury reservoir. This condition of complete reduction is determined by reading the leveled mercury volume at 30-minute intervals until the volume is constant within 0.1 ml.

When complete reduction of the PtO has been achieved, record the gas volume, temperature, and barometric pressure. The gas volume at this point should not be more than 45 ml. Rotate the side arm so as to allow the sample cup to drop into the acetic acid solution. Permit hydrogenation to proceed for about 16 hours. Read the final gas volume, temperature, and pressure. Temperature is read to the nearest 0.1° C. and the pressure to the nearest 1 mm. Correct the initial and final gas volumes to standard conditions, first adding the volume of the uncalibrated system.

$$\frac{(\text{Corrected initial volume} - \text{corrected final volume})\ 0.00900}{\text{grams of sample}} = \%\ H_2\ \text{absorbed}$$

This application is a continuation-in-part of application Serial No. 126,234 filed November 8, 1949, now abandoned.

The processes for the preparation of vinyl esters of chemically stabilized rosin acids disclosed herein are claimed in copending applications, Serial No. 145,079, filed February 18, 1950, and Serial No. 145,080, filed February 18, 1950, both in the name of John C. Robinson, Jr.

What we claim and desire to protect by Letters Patent is:

1. A vinyl ester of a chemically stabilized rosin acid material, said chemically stabilized rosin acid material being selected from the group consisting of hydrogenated rosins, dehydrogenated rosins, hydrogenated rosin acid fractions, and dehydrogenated rosin acid fractions, said hydrogenated rosin acid materials being at least 40% saturated with hydrogen and having a content of abietic-type resin acids of not over 10%, said dehydrogenated rosin acid materials having a dehydroabietic acid content of at least 40% and having an abietic-type resin acid content of not over 10%, said rosin acid fractions being the fractions obtained by removing the neutral bodies from rosins.

2. A vinyl ester of a hydrogenated rosin, said hydrogenated rosin being at least 40% saturated with hydrogen and having a content of abietic-type resin acids of not over 10%.

3. A vinyl ester of a hydrogenated rosin acid fraction, said hydrogenated rosin acid fraction being at least 40% saturated with hydrogen and having a content of abietic-type resin acids of not over 10%, said rosin acid fraction being the fraction obtained by removing the neutral bodies from rosin.

4. A vinyl ester of a dehydrogenated rosin, said rehydrogenated rosin having a dehydroabietic acid content of at least 40% and having an abietic-type resin acid content of not over 10%.

5. A vinyl ester of a dehydrogenated rosin acid fraction, said dehydrogenated rosin acid fraction having a dehydroabietic acid content of at least 40% and having an abietic-type resin acid content of not over 10%, said rosin acid fraction being the fraction obtained by removing the neutral bodies from rosin.

6. A polymer of a vinyl ester of a chemically stabilized rosin acid material as defined in claim 1.

7. A polymer of a vinyl ester of a hydrogenated rosin as defined in claim 2.

8. A polymer of a vinyl ester of a hydrogenated rosin acid fraction as defined in claim 3.

9. A polymer of a vinyl ester of a dehydrogenated rosin as defined in claim 4.

10. A polymer of a vinyl ester of a dehydrogenated rosin acid fraction as defined in claim 5.

11. The process for polymerizing a vinyl ester of a chemically stabilized rosin acid material as defined in claim 1 which comprises heating said vinyl ester in the presence of a peroxide polymerization catalyst.

12. The process for polymerizing a vinyl ester of a chemically stabilized rosin acid material as defined in claim 1 which comprises subjecting said vinyl ester to ultraviolet radiation.

13. The process for polymerizing a vinyl ester of a chemically stabilized rosin acid material as defined in claim 1 which comprises heating said vinyl ester at a temperature of at least 200° C.

JOHN C. ROBINSON, Jr.
WALTER S. ROPP.

REFERENCES CITED

The following references are of record in the file of this patent:

UNITED STATES PATENTS

| Number | Name | Date |
|---|---|---|
| 2,130,997 | Littmann | Sept. 20, 1938 |
| 2,518,509 | Weber et al. | Aug. 16, 1950 |

FOREIGN PATENTS

| Number | Country | Date |
|---|---|---|
| 395,478 | Great Britain | July 20, 1933 |

OTHER REFERENCES

Fleck et al.: Journ. Amer. Chem. Soc., vol. 61, pp. 1230 to 1232, 1939.